United States Patent [19]

Budzynski et al.

[11] 4,248,294
[45] Feb. 3, 1981

[54] SOLAR HOT WATER HEATING SYSTEM

[75] Inventors: John V. Budzynski; Donald A. James, both of Scottsdale, Ariz.

[73] Assignee: Goettl Bros. Metal Products, Inc., Phoenix, Ariz.

[21] Appl. No.: 901,329

[22] Filed: May 1, 1978

[51] Int. Cl.³ .............................................. F28D 21/00
[52] U.S. Cl. ................. 165/104 S; 126/437; 137/592
[58] Field of Search ............... 165/104 S; 126/400, 126/437; 237/19; 137/590, 592

[56] References Cited

U.S. PATENT DOCUMENTS

| | | | |
|---|---|---|---|
| 1,338,055 | 4/1920 | Wadley | 237/19 X |
| 2,061,174 | 11/1936 | Spangenberger | 237/19 X |
| 3,229,683 | 1/1966 | Russell et al. | 137/592 X |
| 4,031,952 | 6/1977 | Contour et al. | 165/104 S |
| 4,071,075 | 1/1978 | Hinkle | 165/104 S X |
| 4,139,055 | 2/1979 | Thomason et al. | 165/104 S X |
| 4,146,087 | 3/1979 | Johansson | 165/104 S |

Primary Examiner—Albert W. Davis
Attorney, Agent, or Firm—Cahill, Sutton & Thomas

[57] ABSTRACT

A solar hot water heating system is provided with solar collectors connected to a hot water storage tank with a recirculating pump to circulate the cooler water in the storage tank through the collector to absorb heat therefrom and to be returned to the storage tank. A plurality of temperature sensors are placed throughout the system to monitor various temperatures and to develop control signals for energizing or de-energizing the recirculating pump, for opening and closing solenoid valves to isolate the solar collectors from the storage tank and for opening and closing solenoid valves to permit supply water to circulate at a predetermined rate through the solar collectors. The storage tank is provided with inlet and outlet stratifier tubes which, while permitting water to be fed into and withdrawn from the tank, produces stratification of the water stored within the tank and increases the overall efficiency of the system.

8 Claims, 6 Drawing Figures

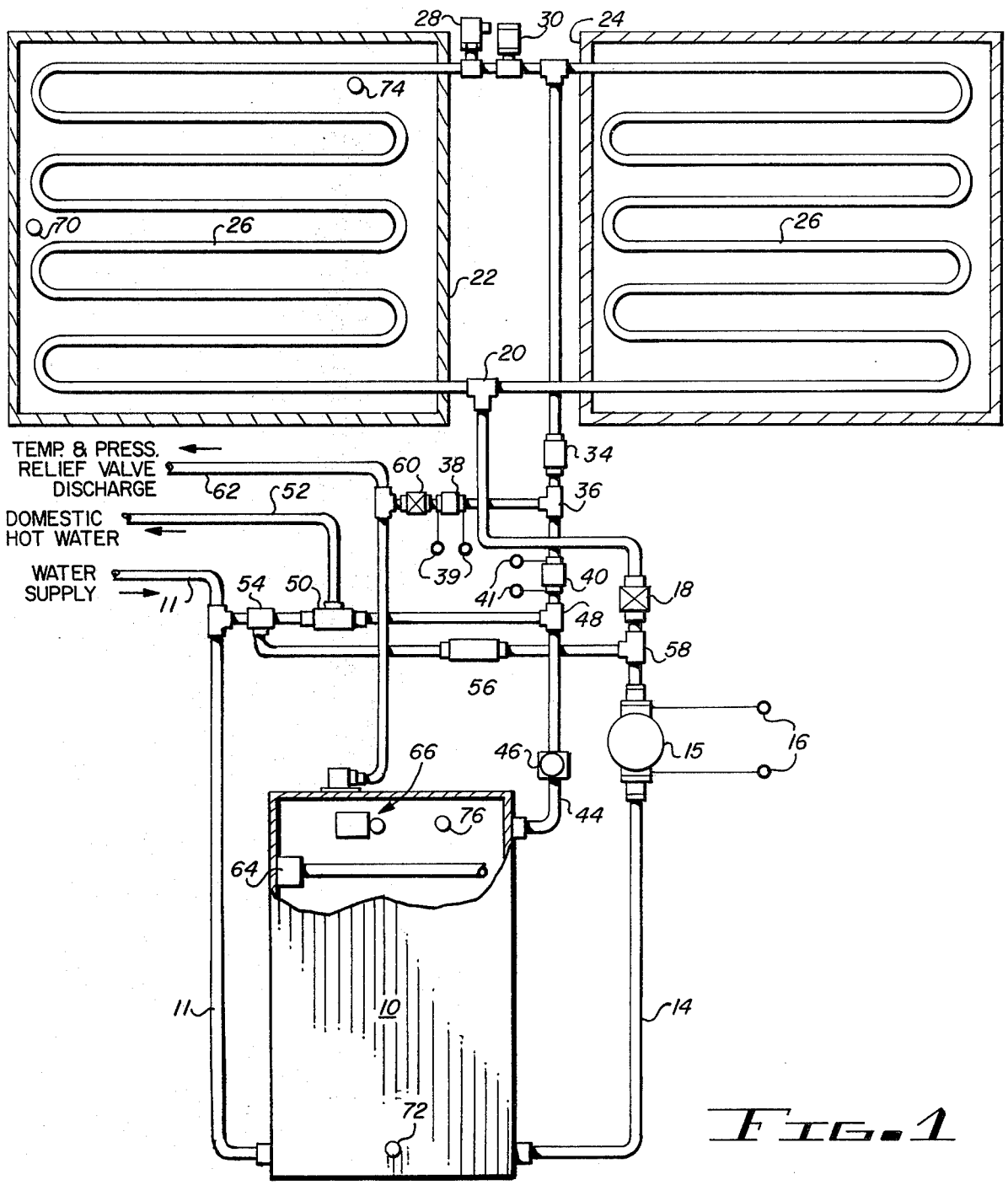

SOLAR HOT WATER HEATING SYSTEM

The present invention pertains to hot water heating systems, and more particularly, to heating systems utilizing solar collectors to heat water for storage and subsequent use.

The utilization of solar energy to heat water has been suggested in a variety of hot water systems in the prior art. The energy savings available through the utilization of solar energy for heating water is manifest and need not be discussed here; however, significant technological difficulties present themselves when the implementation of such solar heating is attempted. For example, difficulties arise as a result of the general nonsynchronous nature of supply and demand; that is, solar heating obviously occurs during daylight hours but demand for hot water usually occurs shortly before or shortly after daylight. Further, such solar heating systems utilize collectors which are usually formed from water-carrying tubes positioned on a heat absorbing surface that is exposed to sunlight. During the times that water demand is at a minimum, and solar heat is at a maximum, it is entirely possible that the collectors may become overheated and cause damage to collector components. Further, it is possible for the water in the collector to freeze during extended low temperature periods thus giving rise to the concomitant destructive effects of the formation of ice.

The prior art has attempted to combat the effects of freezing temperatures by the utilization of systems incorporating a provision for recirculating hot water through the collectors to prevent the formation of ice. Obviously, the utilization of hot water to recirculate through the collectors introduces an inefficiency in the system that is undesirable. Another prior art solution to the possibility of freezing is to drain the collectors and leave them empty during the freezing periods. Unfortunately, when the collectors are again filled with water, significant problems are presented by the air present in the collectors and purging the air from the system presents many difficulties. Other systems incorporate the utilization of electrical heat to warm the collector and prevent freezing (obviously inefficient) and the utilization of a double fluid system. This latter system incorporates a closed antifreeze system which prevents freezing of the water in the collector; however, such systems are extremely dangerous since leaks in the system can give rise to the introduction of toxic substances into the water.

Collector overheating problems have generally been treated by utilizing collectors that are sufficiently inefficient to insure that the maximum temperatures are below those temperatures that may be deleterious to the collector. For example, collectors may be formed having a substantially transparent cover (glazing) forming a dead air space between the glazing and a flat black surface on which the water carrying tubes are mounted. Solar heat enters this dead air space and becomes trapped; however, during nighttime, it is possible for the radiation from the collector to be such that the temperature of the collector goes below freezing with resulting freezing of the water in the tubes. To combat this effect, prior art collectors have typically resorted to "double glazing"; that is, the use of two transparent layers to form an additional insulating barrier to minimize the radiation and conduction of heat from the collector during nighttime. While this method may effectively minimize the problem of freezing, it also significantly reduces the efficiency of the collector since additional interfacing surfaces are presented to the sunlight causing additional reflections and reduced radiation transmission efficiency.

It is therefore an object of the present invention to provide a solar hot water heating system that more efficiently utilizes solar heat than heretofore possible in prior art solar heating systems.

It is another object of the present invention to provide a solar hot water heating system that incorporates protection against overheating and freezing without draining the solar collectors, heating the solar collectors, or incorporating a double fluid system.

It is another object of the present invention to provide a solar hot water heating system having an efficient hot water storage tank.

It is still another object of the present invention to provide an improved hot water storage tank incorporating stratification of the water within the tank to maximize the hot water heat storage capacity of the tank, and having a unique input/output system to efficiently receive, store, and supply heated water.

It is still another object of the present invention to provide a solar hot water heating system wherein water is recirculated between solar collectors and a storage tank and wherein temperature sensors develop control signals for initiating or terminating such recirculation.

These and other objects of the present invention will become apparent to those skilled in the art as the description thereof proceeds.

Briefly, in accordance with the embodiment chosen for illustration, a hot water system utilizing solar collectors as a source of heat is provided with a storage tank for receiving and storing hot water. The storage tank is also provided with an electrically operated heater coil similar to that used in conventional hot water heating systems. The electrically operated coil is utilized as a reserve heat system to add heat to the water in the storage tank when the conditions for obtaining solar heat are unfavorable. The storage tank incorporates an input tube, an output tube, and a combined input/output tube all of which are formed to introduce or extract water from the tank and to maintain stratification of the water within the tank. Water is admitted to the tank from a typical water supply such as a city water system, which maintains the pressure within the tank at the supply line pressure. Water is extracted from the bottom of the tank and circulated through solar collectors through the utilization of a recirculating pump. Water heated in the solar collectors is returned to the top of the storage tank through a stratifier tube. When water is required for use from the system, water is withdrawn from the same stratifier tube utilized to deliver hot water to the tank and is fed to a domestic hot water output line where the heated water is mixed with supply line water and delivered to the user.

A conventional thermostatic sensor is placed in the storage tank and is set to energize the electric coil to add reserve heat to the water in the storage tank when a certain predetermined minimum temperature is reached; however, temperature sensors are placed in a lower portion of the storage tank, in a position adjacent the thermostatic sensor, and in a position on the collector to derive a differential temperature signal together with an inhibit signal to override the thermostatic temperature controller (under certain conditions) and inhibit the energization of the reserve heat coil. Another temperature sensor is positioned on the collector and is utilized to determine an overheat condition existing at the collector; one of the previously mentioned sensors utilized to develop the differential temperature signal is also utilized to detect a freezing temperature condition at the collector. The detection of an overheat or freeze condition in the collector activates solenoids within the recirculating system to isolate the collectors from the storage tank and to admit supply line water directly to the collector to either reduce the temperature of the collector or to prevent the formation of ice in the collector.

The present invention may more readily be described by reference to the accompanying drawings in which:

FIG. 1 is a schematic representation of a solar hot water heating system constructed in accordance with the teachings of the present invention.

FIG. 2 is a schematic circuit diagram indicating a conventional thermostatic system for energizing the reserve heat coil in the system of FIG. 1.

FIG. 3 is a schematic circuit diagram of an alarm system incorporated in the system of FIG. 1 to inform the user of an overheat condition in the solar collectors.

Figure 4:
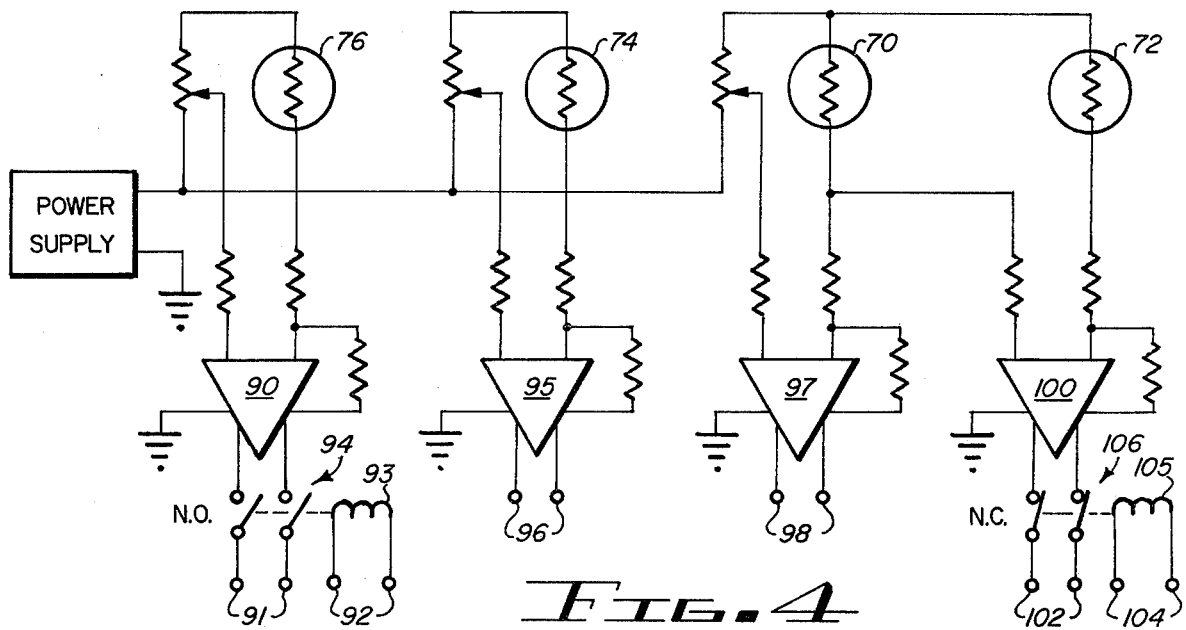
FIG. 4 is a schematic circuit diagram illustrating the generation of control signals derived from strategically located temperature sensors.

Referring now to FIG. 1, a solar hot water heating system constructed in accordance with the teachings of the present invention is shown. A hot water storage tank 10 is utilized to receive and store hot water for subsequent useage; water is received by the storage tank 10 through an incoming supply line 11 connected at one end to a common water supply such as a city water line. Water is extracted from the storage tank 10 through an output line 14 and recirculated by a recirculation pump 15; the pump 15 may typically be a conventional single phase fractional horsepower pump readily available throughout industry. It has been found that a 1/20th horsepower electric pump is adequate to recirculate the water necessary in a domestic hot water system; further, depending on intended useage as well as climatic conditions, it is possible that the power consumption required of the pump 15 may be small enough to require the use of a pump motor as little as 1/32nd horsepower. The pump 15 shown in FIG. 1 is energized by application of electrical power to the terminals 16 as will be described more fully hereinafter. The output line 14 is connected to the pump 15 which supplies water through a metering valve 18 and a T-junction 20 to a pair of solar collectors 22 and 24. The metering valve 18 is a conventional metering valve of the type that may be set to permit the passage of a predetermined flow rate of water; the valves are frequently known as "circuit setters" in the industry and are standard throttling valves such as that manufactured by Bell & Gossett. The flow rate will normally be set in accordance with the size of the collectors and overall system capacity. The water from the output line 14 is thus applied to each of the solar collectors 22 and 24.

The collectors may be of conventional format and are typically formed with a black solar absorbing background plate having pipe coils 26 placed thereon to conduct water over the solar heated surfaces through the pipes to heat the water therein. The collectors are covered with a relatively transparent material (glazing) to admit solar energy and trap the heat within the collectors so that the heat may be absorbed by, and carried away by, the water within the tubes. The precise form of collector is not critical although with the system of the present invention, the collectors may be designed having only a single glazing surface to thereby maximize their efficiency and utilize the maximum energy derived from impinging solar radiation. Since the system of the present invention incorporates an overheat protection arrangement, the solar collectors are protected from damaging effects of temperatures that would otherwise range high enough to physically damage the components of the collector. The overheat protection system will be described in more detail later on.

The system will normally incorporate a conventional temperature-pressure relief valve 28 and an air purging auto air vent 30. The relief valve 28 acts only as an emergency device and would normally not operate unless an emergency situation occurs. The water thus circulated through the tubes 26 in the collectors 22 and 24, are delivered through a collector output line 32 through a strainer 34 to a T-junction 36. At this point, the heated water may travel either of two directions which will be determined by the energization of solenoid valves 38 and 40. Each of these valves is energized by application of an appropriate electrical signal to the terminals 39 and 41 respectively; each of the valves is normally closed. During normal operation, the valve 38 (freeze and overheat protection valve) will be closed and the valve 40 (anti-thermal siphon valve) will be opened such that water from the collector output line 32 is delivered through a hot water input line 44 back to the hot water storage tank 10. A conventional mechanical or manual shut-off valve 46 is provided in the line for maintenance purposes. It may be noted that the hot water from the collector output line 32, after passing the valve 40, also passes through the T-junction 48 to permit the hot water to be delivered to a tempering valve 50. When required, hot water is thus delivered directly from the collector output line through the T-junction 48 to the tempering valve 50 where it is combined with cold water from the water supply line and delivered to the user through a domestic hot water line 52.

The tempering valve 50 is a standard mixing valve available in the industry such as that produced under the trademark Watts Type N 170. Incoming water from the water supply line or input line 11 is also supplied through a T-junction 54 and check valve 56 to the output line 14 through a T-junction 58. Thus, it may be seen that water may be delivered from the storage tank 10 through the output line 14 to the collectors 22 and 24, or may be delivered directly from the water supply line 11 to the collectors 22 and 24 through check valve 56. Under normal operating conditions, when the recirculating pump 15 is on, the pressure in the output line 14 will be above the pressure of the incoming water supply line such that all of the water being supplied to the collectors will be recirculating water from the storage tank. The check valve 56 prevents water in the recirculating system from backing up into the water supply line 11. The check valve 56 is a standard check valve utilized for domestic water systems, several varieties of which are manufactured by manufacturers in the industry such as Watts.

Heated water in the collector output line 32, after passing through the strainer 34 is delivered through the T-junction 36, and through the solenoid valve 38 (when energized) through a metering valve 60 (which is the same type of valve as metering valve 18) to a discharge line 62. The discharge line 62 is the conventional discharge line provided for hot water tanks such as storage tank 10. The line 62 is connected to tank 10 through a temperature-pressure relief valve such as that shown at 64 which is present on all hot water tanks. That is, in the event of an overheat condition in the hot water tank, safety requires that a relief valve to permit escaping water and steam to be conducted through a discharge line to either a drain or a catch tank. Thus, when the solenoid valve 38 is energized, the water exiting from the collectors through collector output line 32 is directed through metering valve 60 to the discharge line 62 and subsequently to a drain or catch tank.

When hot water is desired, and a domestic hot water user turns a hot water valve on, hot water is delivered through the line 52 from the tempering valve 50. The tempering valve, as mentioned previously, is a conventional tempering valve that mixes a proportion of cool or cold water from the water supply line input 11 and hot water from the T-junction 48. It may be noted that the hot water delivered to the T-junction 48 may come either directly from the collectors 22 and 24 via the collector output line 32 or may come from the hot water "input" line 44 of the storage tank 10. Thus, the line 44 serves both as a hot water input line to the storage tank 10 as well as a hot water output line from the tank to the T-junction 48. The hot water thus delivered to the user may come either from the storage tank or directly from the collectors as determined by the conditions sensed by the sensors to be described.

The storage tank 10 incorporates a reserve heating element, shown schematically at 64, which is formed of a conventional electric heating element commonly used in electric hot water heaters. The hot water heating element 64 may be utilized to supplement the heat provided by the solar collectors when the conditions for solar heating are unfavorable. The electric heating element 64 operates in conjunction with a standard thermostat incorporating controls shown schematically at 66. The thermostat and controls 66 are standard hot water tank controls presently utilized in conventional electric hot water heating tanks and produced by various manufacturers such as Robertshaw. In addition to the thermostat controls 66, the present invention incorporates a number of temperature sensors strategically located throughout the system.

A sensor 70 is positioned on the surfce of the collector 22 to sense the temperature of the surface and is utilized to generate an electrical signal indicating the existence of freezing conditions; further, the electrical signal derived from the sensor 70 is also utilized in combination with an electrical signal developed from a similar electrical sensor 72 positioned near the bottom of the storage tank to detect the temperature of the water near the bottom in the tank. The electrical signals derived from the temperature sensors 70 and 72 are combined to develop a differential signal indicative of the differential temperature betweeb the solar collector and the water at the coldest portion of the storage tank. This differential temperature will be utilized to perform several control functions as will be described later on.

A temperature sensor 74 is positioned on collector 22 and is utilized to develop an electrical signal indicative of an overheating condition on the collector. This signal may be utilized to perform several functions related to the overheating condition on the collector. A fourth temperature sensor 76 is positioned near the temperature sensor of the thermostat 66 in the hot water storage tank 10. This latter temperature sensor is deliberately positioned near the thermostatic temperature sensor to provide an electrical signal that may be utilized to inhibit the energization of the reverse electrical heating coil under certain prescribed conditions.

The temperature sensors utilized in the embodiment chosen for illustration are mounted at strategic locations on the hot water storage tank and the solar collectors as described above. For example, the sensors may be thermistors placed in contact with a chosen surface and are positioned on the collectors and tank by mounting the sensors on the surface of the tank or the face of the collector; the sensors are empirically positioned to provide an output signal indicating the appropriate condition. That is, sensor 74 of the type described is positioned as shown in FIG. 1, which position is empirically determined to be near the point in the system where the water flowing through the solar collectors is at its hottest. This positioning is a simple matter and a suitable location for the sensor is readily ascertainable. By using the previously described types of sensors that are mounted on the collector (rather than emersion types extending into the pipe or tank), prodqction economies can be achieved since such sensors are typically only a fraction of the cost of emersion-type sensors. Therefore, it will be obvious to those skilled in the art that the above described sensors may also be chosen to be emersion-types, in which event the sensors will extend into the water in the system at the corresponding locations. It will also be apparent therefore that when reference is made to the temperature detection of the water at various points in the system, the term "temperature detection" is meant to include both direct detection (such as by emersion sensors) or indirect detection (as by sensors of the type described and positioned as suggested herein).

Before describing the purpose and operation of the various sensors positioned about the system of the present invention, it will be useful to first describe the operation of a standard thermostatic control for energization of the reserve heat coil 64. Referring now to FIG. 2, a standard thermostatic temperature sensor and control is shown at 80 and is supplied with appropriate electrical power at terminals 81. When the thermostat detects a predetermined minimum temperature, which for example may be set at a conventional 135° F., the thermostat causes the application of electrical power to the heater coil 82 which, in most conventional electrically heated water heaters, is formed of a loop of resistant material somewhat resembling the electrical burners on an electrically powered stove. In the present system, the circuit supplying power to the heater 82 is interruptible through the expediency of a solenoid operated switch 84 which is in a normally closed position as shown in FIG. 2. Thus, when the thermostat detects a water temperature below 135° F., the thermostat applies power to the heater coil 82, and the water is electrically heated. However, if the coil 86 is energized through the application of an appropriate electrical signal to terminals 87, the switch 84 is opened and electric current can no longer flow through the heater 82. Thus, the switch 84 operates to selectively inhibit the operation of the heater 82 notwithstanding the fact that thermostat 80 attempts to supply power to the heater in response to a temperature below a selected 135° F.

Referring now to FIG. 4, a schematic circuit diagram is shown incorporating the temperature sensors utilized in the system of the present invention showing the functional interrelationship of the signals derived from each of the sensors. All of the sensors, 70, 72, 74 and 76 are conventional, readily available temperature sensors of the thermistor type; for example, it has been found that Rho Sigma type ST thermistor sensors are suitable for detecting temperatures within the ranges for which the present system is designed. Each of the devices, being a thermistor, presents a resistance that varies with temperature and, in the types of thermistors described, having negative temperature coefficients. It will be understood by those skilled in the art that the specific types of temperature sensors, as well as the type of circuit, is really not important and the concept of the present invention is embodied in the utilization of temperature sensors located throughout the system to develop control signals to implement the functions to be described. The temperature sensor 76 is positioned on the storage tank 10 (FIG. 1) to sense the temperature of the water within the tank at a location generally adjacent the thermostat utilized to operate the reserve heater 64. The signal developed by the resistance variation of the sensor 76 is amplified in an amplifier 90 and applied to terminals 91. The signal present at these terminals is used to inhibit the energizations of the electric reserve heater as will be described. The signal otherwise present on terminal 91 may be interrupted through the energization of the coil 93 of normally closed switch 94. The connection of this latter switch and the function performed thereby will be described later.

Sensor 74 is positioned on the solar collector at a location empirically determined as one of the highest temperature locations to enable the sensor to detect the presence of an overheating condition. The existence of an overheating condition requires immediate attention and the implementation of several functions. The change in resistance of the thermistor forming the sensor 74 is amplified in an amplifier 95 and applied to two terminals 96. The signal at the terminals 96 is utilized in three different control functions. First, the signal is applied to the terminals 39 of the solenoid valve 38 (FIG. 1) to energize the valve and open the valve to permit passage of water therethrough. The signal at terminals 96 is also applied in a manner to disable a differential temperature signal as will be described later, and is further used to energize an indicator circuit to provide the user with an indication that the solar collectors are in an overheat condition.

Sensor 70 is also positioned on one of the solar collectors and is strategically located to sense temperatures in the coldest portions of the collector. The sensor 70 is intended as a freeze detection sensor; the change in resistance of the thermistor forming a part of the sensor 70 is sensed and amplified in an amplifier 97 and applied to terminals 98. The signal present at terminal 98 is applied to terminals 39 of the solenoid valve 38. Thus, a signal from either terminals 96 or terminals 98 will energize the normally closed solenoid valve 38 and permit passage of water therethrough.

The sensor 72 is positioned near the bottom of the storage tank 10 and is located to sense the coldest, or near the coldest, water in the tank. The signal developed by the change in resistance of the thermistor forming a part of the sensor 72 is sensed in amplifier 100 and compared with the signal developed by the sensor 70 to derive a differential signal representing the difference in temperature between the water located at the sensor 70 and the sensor 72. Thus, the signal amplified by the amplifier 100 and applied to terminals 102 represents the temperature differential between water in the collector and water in the coldest location in the storage tank. This differential temperature signal available at terminals 102 is utilized to perform several functions. First, the signal at terminals 102 is applied to the terminals 41 of the normally closed solenoid valve 40 to thereby energize the valve and open the valve to permit water to flow therethrough. Second, the signal at the terminals 102 is applied to the terminals 92 of the normally closed relay 94 which prevents the signal derived from the sensor 76 from being made available at the terminals 92. The operation of the switch 94, when energized, thus prevents a signal at 91 from inhibiting the energization of the reserve heat coil 64; that is, while the signal normally present at the terminals 91 will prevent electric power from being used to generate reserve heat in the reserve heat coil 64, the control function of the signal on terminals 91 can be preempted by the signal at the terminals 102 to thus permit the energization of the reserve heat coil 64 in accordance with the dictates of the standard thermostatic temperature sensor 66. The third function of the signal at terminals 102 is the energization of the recirculating pump 15 through the application of the signal from terminals 102 to the terminals 16 (FIG. 1). Thus, when a signal is present at the terminals 102, normally closed solenoid valve 40 is energized and therefore opened, the recirculating pump 15 is energized and water may therefore flow from the colder portion of the storage tank through the collectors back to the storage tank or to the domestic hot water user.

The signal present at terminals 102 may be inhibited by the application of an energizing signal to the terminals 104 of the coil 105 of normally closed switch 106. As mentioned previously, the detection of an overheat condition in the solar collector by the sensor 74 resulted in a signal applied to the terminals 96. This signal was utilized for several functions, one of which was to interrupt the differential temperature signal circuit. Thus, the signal appearing at terminals 96 is applied to the terminals 104 to therefore prevent the application of a differential temperature signal to the terminals 102. It may therefore be seen that an overheat condition resulting in an overheat signal at terminals 96 will cause an opening of a normally closed switch 106 which, in turn, will therefore cause the deenergization of the solenoid valve 40, the deenergization of the recirculating pump 15, and the deenergization of the switch 94 (FIG. 4).

The sensors, 70, 72, 74 and 76 have been shown in a functional circuit diagram to illustrate the functions performed by the sensors; it will be obvious to those skilled in the art that the specific circuit utilized may vary. For example, while the amplifiers shown are conventional discrete operational amplifiers that are readily available, it may nevertheless be possible to incorporate all the electrical control functions in a monolithic integrated circuit chip or groups of chips. Similarly, for purposes of illustration, all of the switches have been shown as electromagnetically operated relays when, in fact, it will be apparent that transistorized or integrated circuit switching techniques will greatly reduce the bulk and power consumption of the control circuit as well as render the operation of the circuit more reliable. When operating electromechanical devices such as the solenoid valves, it may be necessary to amplify control signal to an appropriate power level in order to supply sufficient power to operate the solenoid. It may also be possible to combine certain temperature sensors; for example, the overheat sensor 74 and the freeze sensor 70 may be combined into a single sensor appropriately placed on the solar collector. Further, it may be possible to use a single temperature sensor for operating the conventional thermostat 66 (to energize the reserve heater), and for generating the signal now generated by the sensor 76 in the embodiment chosen for illustration. That is, a single sensor could be used to detect the temperature, and appropriate circuitry used to determine if the detected temperature is above or below the highest or lowest permissible temperature. However, the best operation at present has been found through the use of separate sensors as shown.

Referring now to FIG. 3, a suitable overheat indicator circuit is shown which may be coupled to a conventional source of power at terminals 108 to provide energy for indicator lamps 109 and 110 and an audio alarm circuit 111. The lamp 109 signals an overheat condition to the solar heating system user; the audio alarm circuit 111 is connected in parallel with the lamp 109 to thereby provide the user with audible, as well as visual, alarm. A manual switch 112 is provided to enable the user to disengage the audio circuit as shown in FIG. 3; the disengagement of the audio circuit will automatically energize indicator lamp 110 to indicate that the audio circuit has been placed in the off condition. The energization of the visual/audio alarms in FIG. 3 is effected through energization of normally open switch 115 through the application of energizing signal to the terminals 117. The signal applied to the terminals 117 is derived from the terminals 96 (FIG. 4). The signal appearing at the terminals 96 represents an overheat condition present in the solar collectors.

Prior art hot water storage tanks typically incorporate a cold water supply pipe that extends from the exterior of the top of the tank vertically down into the tank, terminating short of the bottom of the tank. Cold water supplied to the tank thus travels downwardly through the tube and exits near the bottom of the tank. The hot water outlet also enters the tank through the top and extends downwardly terminating slightly past the interior top of the tank. When hot water is withdrawn from this typical prior art hot water tank, and the hot water withdrawal lasts for more than a very brief period of time such as when the water is being used for laundry, shower, etc., the cold water entering the tank near the bottom thereof through the vertically disposed cold water supply line has a tendency to form a stream within the tank that is directed to the hot water outlet pipe at the top of the tank. This cold water stream is obviously warmed as it passes upwardly through the warmer water in the tank; however, the water exiting from the tank is lower in temperature than would be expected in view of the warmer water adjacent the top of the tank. This stream effect appears to be somewhat similar to the effect documented in major ocean streams wherein cold or hot water streams penetrate and travel through larger bodies of water of substantially differing temperature. The volume of water traveling in prior art tanks from inlet to outlet generates turbulence and causes undesired mixing of hot and cold water. The storage tank of the present invention overcomes these disadvantages by stratifying the water in temperature layers.

Figure 5:
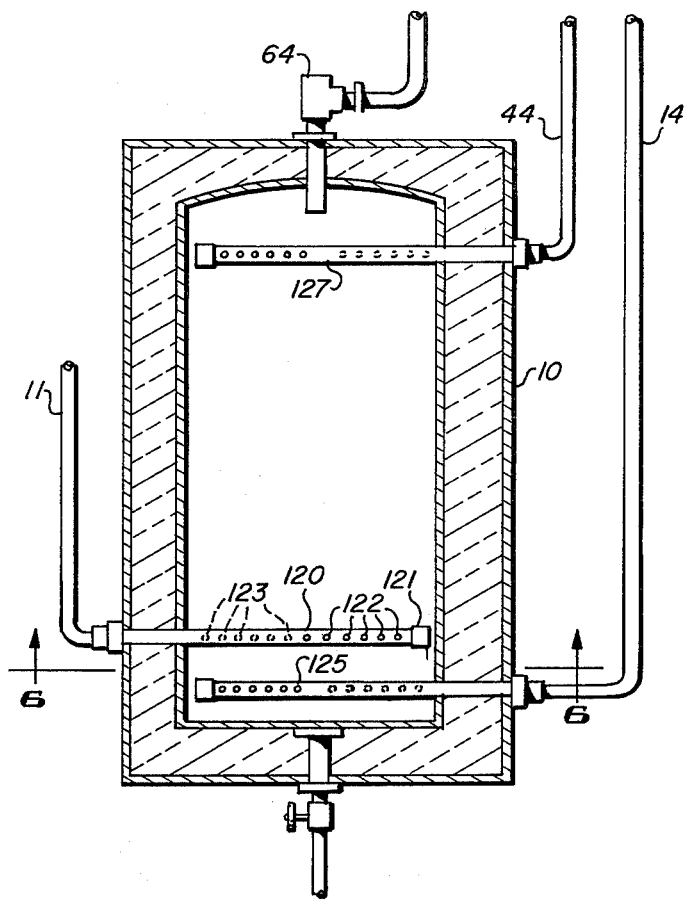
FIG. 5 is a cross-sectional view of a hot water storage tank constructed in accordance with the teachings of the present invention.
Figure 6:
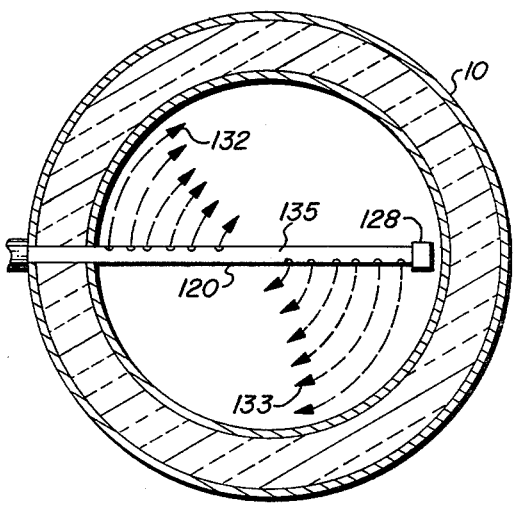
FIG. 6 is a cross-sectional view of FIG. 5 taken along line 6—6.

Referring now to FIG. 5, a portion of FIG. 1 is shown with the storage tank 10 shown in cross-section. It may be seen that water from a suitable supply, such as a city water supply, is delivered through input line 11 to the interior of the tank. Water is supplied to the tank through a stratifier tube 120 which may be formed of a conventional copper tube appropriately capped at its end 121 and provided with a plurality of openings 122 and 123 drilled adjacent the opposite ends of the tube and on opposite sides of the tube. A second stratifier tube 125 is connected to the output line 14, and a third stratifier tube 127 is connected to the hot water input/output line 44. The stratifier tubes may best be described by reference to stratifier tube 120 shown in FIG. 6. The tube is formed of any suitable material such as copper and is capped at one end 121 to prevent water from escaping longitudinally from the tube. A plurality of evenly spaced openings 123 (not visible in FIG. 6) are drilled in the side 129 of the tube to permit water to escape from the interior of the tube. A similar plurality of openings 122 are drilled in the opposite side 130 of the tube adjacent the opposite end of the tube. Water escaping from the side 129 of the tube is indicated in FIG. 6 by the arrows 132 while the water escaping from the side 130 of the tube is indicated in FIG. 6 at 133. Thus, it may be seen that the water exiting from the tube 120 escapes in a plurality of streams directed in a plane perpendicular to the axis 135 of the tank 10. The volume of the water flowing in any one stream is significantly less than would flow in a single stream such as in the prior art; further, the gentle introduction of the water resulting from the plural streams combined with the angled direction of water flow insures the temperature stratification of the water to maintain a layered temperature gradient. Similarly, stratifier tube 125 draws cold water from the tank through a plurality of openings positioned to gently withdraw water in a circular pattern to minimize turbulence and mixing of the water. In FIG. 5, the circular direction of the stratifier tubes 120 and 125 are reversed; however, it is not necessary that the tubes be oriented in this particular fashion.

The stratifier tube 127 operates as a hot water input/output and is connected to the hot water input/output line 44. Thus, hot water delivered from the solar collectors may be injected in the storage tank through the stratifier tube 127 or, in the event hot water is being withdrawn from the system for use, the flow may reverse in the stratifier tube and hot water withdrawn from the tank. The stratification of the water through the use of the stratifier tubes prevents the stream effect and inhibits the direct flow of cold water from cold water inlet to the hot water outlet. It has been found that the gentle introduction of water into the tank by causing the water to flow substantially in a plane at an angle with the longitudinal axis of the hot water tank effectively maintains the hottest water near the top of the tank and minimizes turbulent mixing of the water at various temperatures; the effect achieved through the use of the stratifying technique is somewhat similar to that achieved through the use of baffles positioned in the tank. However, hot water tank construction is greatly complicated through the incorporation of baffles and the costs of such tanks are therefore much greater than a tank achieving the same function through the use of stratifier tubes.

The operation of the system of the present invention may now be described. It may be noted that the sensors of FIG. 4 may all be set at predetermined temperature values and that the standard thermostat used for energizing the reserve heat coil 64 may all also be set at a chosen temperature. It has been found that a thermostat temperature of 135° F. is a typical and suitable value. The sensor 76 is adjusted so that a signal appears at terminals 91 when the temperature sensed thereby is 110° F. or above. The temperature to be sensed by the sensor 74 can be adjusted so that a signal appears at terminals 96 when the sensed temperature is 195° F. or above. Similarly, the temperature sensed by sensor 70 to produce a freeze condition signal at terminals 98 can be adjusted to 35° F. or below. Sensor 72 is adjusted so that the differential temperature between the temperature sensed by sensor 70 and the temperature sensed by sensor 72, to produce an output signal at terminals 102, is approximately 17° F. That is, if the differential temperature is 17° F. or more, a signal is presented at terminals 102. When the differential temperature is less than 3° F., no differential signal is generated and applied to terminals 102.

With the above nominal temperature settings, and during daylight hours when sufficient solar energy is available to heat the water in the collectors, the temperature differential between the sensors 70 and 72 will normally be in excess of 17° F., thereby causing the generation of a signal at terminals 102 (FIG. 4). This signal will energize the recirculating pump 15 and will energize the solenoid valve 40 to cause the valve to open. Therefore, cold water will circulate from the storage tank up through the collectors, will then absorb heat, and will travel back to the storage tank to be injected therein through the hot water stratifier tube. This recirculation continues so long as the differential temperature sensed by the sensors 70 and 72 exceeds 3° F. In the event the water temperature in the tank is sufficiently raised, or in the event insufficient solar energy falls on the collectors to maintain the differential temperature at a value in excess of 3° F., the output signal at terminals 102 is no longer maintained, resulting in the deenergization of the recirculating pump 15 and the solenoid valve 40. When the pump 15 is deenergized, water is no longer circulated between the collector panels and the storage tank. Further, when the solenoid valve 40 is deenergized, it closes to thus effectively isolate the solar collector panels from the storage tank. Under these conditions, the storage tank is now "on its own" and merely stores hot water for use. In the event the water in the storage tank 10 drops below 135° F., the standard thermostatic sensor will sense the decreased temperature and will energize the reserve heat coil 64 to add heat to the water in the tank and bring the water up to the predetermined temperature. Since the differential temperature signal at 102 is off, the normally open contacts of switch 94 are open.

Since the differential temperature signal normally present at terminals 102 is not present, the normally open switch 94 remains open and the heater 82 may be energized by the thermostat 80 without interference from the inhibiting effects of a signal at terminals 91 which would open switch 84 in the heater circuit. Thus, when the differential temperature is less than 3° F., the water temperature is under the control of the standard thermostat which, when the water is below 135° F., will energize the electric heating coil to provide reserve heat to the storage tank.

When sufficient solar energy again impinges on the collectors 22 and 24, such that the differential temperatures sensed by sensor 70 and 72 exceeds 17° F., a differential temperature signal will appear at terminals 102 which will energize the coil 93 of the normally open switch 94 to close the terminals thereof. Under these latter conditions the sensor 76 (which is placed close to the standard temperature sensor of the thermostat), senses water temperature, and if it is in excess of 110° F., a signal will be produced at terminals 91. This signal at terminals 91 is applied to coil 86 of normally closed switch 84 to open the heater circuit. Thus, an added control function has been implemented so that when the differential temperature is such that the water is recirculating through the collector panels, the temperature at which the reserve heater is energized is now no longer the temperature set by the standard thermostat (135° F.), but rather the temperature set by the sensor 76 (110° F.). This interrelationship of the temperatures becomes important and provides significant efficiency increases since the circumstances requiring this interaction occur quite frequently. For example, in the early morning when the system first detects the presence of solar radiation and the differential temperature quickly exceeds 17° F., the recirculating pump is energized and water begins to recirculate; however, the thermostat which has been set at 135° F. will detect a drop in temperature below the set value since water is now being recirculated in the tank as a result of the energization of the recirculating pump. The lower temperature is, however, only a temporary condition because the water is now being heated by the solar radiation impinging on the solar collectors. Therefore, to prevent the electric reserve heater from being energized during this early morning condition when such reserve heat is really not necessary, the above described interaction between the differential temperature signal and the signal derived by the sensor 76 inhibits the heater's energization. Thus, as long as the water in the storage tank remains at 110° F. or above, and the differential temperature is such that the recirculating pump is on, no electrical energy will be utilized by the system. If the temperature in the storage tank goes below 110° F., then the fact that the recirculating pump is on and the fact that the differential temperature may be 17° F. or above does not prevent the energization of the electric heater. In the latter circumstances, electrical energy will be used to supplement the heat derived from the solar collectors to more rapidly heat the water to an acceptable temperature level.

In the event an overheat condition occurs on the solar collector as determined by the temperature sensor 74, the signal generated at terminals 96 immediately energizes the coil 105 of normally closed switch 106 to open the differential temperature signal circuit. Thus, the recirculating pump 15 is immediately deenergized and the solenoid valve 40 is deenergized, thus isolating the storage tank from the solar collectors. Simultaneously, the signal at terminals 96 is applied to normally closed solenoid valve 38 to open the latter and permit water to pass through metering valve 60 directly to the discharge line 62. Under these latter conditions, water is supplied from the water supply input line 11 through the T-junction 54 through the check valve 56, T-junction 58, metering valve 18 to the solar collectors. As long as an overheat condition is sensed by the sensors 74, water from the water supply such as city water, is circulated directly through the collectors to the discharge line at a predetermined rate to cool the collectors; during this circulation of cold water from the supply through the collector, the hot water in the storage tank is effectively isolated from the collectors and maintains a ready supply of hot water for the user.

The detection of the overheat condition also energizes the indicator circuit of FIG. 3 as previously described to provide the user with an indication of the overheat condition. It may be noted that a user who observes the indicator and recognizes the existence of an overheat condition, may take advantage of that fact since the overheat condition indicates that there is an over abundance of solar energy to replace any hot water that he may use and he may therefore choose to perform those duties that require large amounts of hot water at this time. When the overheat condition ceases as a result of circulating cool water through the collector, the overheat signal will cease and the system will return to its normal operation.

In the event a freeze condition is detected by the sensor 70, a freeze signal is generated and applied to the terminals 98. This freeze signal will operate in a somewhat similar fashion to that of the overheat signal. That is, the signal present at terminals 98 operates or energizes the normally closed solenoid valve 38. Since a freeze condition will obviously result in a differential temperature between sensors 70 and 72 of less than 3° F. (the difference will undoubtedly be negative), the recirculating pump 15 and the solenoid valve 40 will already have been deenergized. Thus, water from the supply line is fed through the check valve 56 through the collectors, through the solenoid valve 38, through the metering valve 60, to the discharge line 62. Thus, water is continuously circulated through the collectors to inhibit the formation of ice. During this recirculation period, the storage tank is isolated from the collector and operates in conjunction with the reserve heat coil 64 to preserve the water at the appropriate temperature.

The flow rates chosen for the solar collectors are determiqed in accordance with conventional heat transfer principles to effectively derive maximum heat from the impinging solar radiation. Similarly, the metering valves may be set to remove excess heat in an overheat condition or to add sufficient heat in a freeze condition to prevent the formation of ice. The discharged water resulting from an overheat or a freeze condition may either simply be fed to a suitable drain or may be collected for subsequent use.

When hot water is required, and a valve or faucet is opened, by the user, hot water is drawn from the T-junction 48 through a tempering valve 50 to the hot water line 52. As mentioned previously, the hot water supplied to the tempering valve 50 is mixed with supply line water in a manner well known in the art. The hot water supplied to the T-junction 48 may come from the solar collectors or from the storage tank. When the recirculating pump 15 is energized, and the solenoid valve 40 is energized and thus open, hot water will be supplied to the user directly from the solar collectors through the tempering valve 50; however, under those conditions described above wherein the solenoid valve 40 is deenergized thus isolating the collectors from the storage tank, the hot water is supplied to the user through the T-junction 48 and tempering valve 50 from the storage tank 10. It may be noted that water heated by the collectors is supplied to the storage tank. That is, the stratifier 127 admits water to the storage tank as well as withdraws water from the storage tank, depending on the system's conditions. The utilization of a single input that also acts as an output for the hot water in the storage tank produces additional efficiencies in that the hottest water is injected into the storage tank, in stratified form, to be maintained immediately adjacent that same inlet which is to be used as an outlet in the event hot water is demanded from the tank. The hottest water is thus the most readily available and the overall system will therefore supply the hottest water available in the system at all times to thereby maximize the use of solar energy and minimize storage losses.

We claim:

1. A hot water storage tank for receiving unheated water from a water supply source and for providing heated water to a hot water user, comprising:
   (a) an elongated tank having a longitudinal axis;
   (b) means defining an inlet in said tank for receiving water from said unheated water supply source;
   (c) means defining an outlet for delivering heated water from said storage tank to a user; and
   (d) a stratifier tube connected to said inlet, extending into said tank and having a plurality of openings therein, each of said openings having an axis, each of the axes of said openings lying in a common plane, the common plane being perpendicular to said longitudinal axis, each of said openings also positioned to direct a stream of water in a circular pattern about said longitudinal axis.

2. The hot water storage tank of claim 1 wherein said elongated tank is cylindrical.

3. An improved hot water tank, for use in a hot water heating system having a heating means external to said tank for heating water and having a hot water supply line for delivering hot water to users, said tank having a longitudinal axis, said tank including:
   (a) a first connection to said tank forming an inlet means communicating with the interior of said tank for connection to a source of unheated water;
   (b) a second connection to said tank forming an outlet means communicating with the interior of said tank for connection to said heating means for delivering unheated water from said tank to said heating means; and
   (c) a third connection to said tank comprising a stratifier tube communicating with the interior of said tank for connection to said heating means and to said hot water supply line to receive heated water from said heating means and to deliver heated water to said hot water supply line, said stratifier tube having a plurality of openings therein, each of said openings having an axis, each of the axes of said openings lying in a common plane, the common plane being perpendicular to said longitudinal axis of said tank, each of said openings also being positioned to direct a stream of water in a circular pattern about said longitudinal axis of said tank.

4. The improved hot water tank of claim 3 wherein said inlet means directs a plurality of streams of unheated water into tank.

5. The improved hot water tank of claim 4 wherein said streams of unheated water are directed in a plane forming an 90° angle with respect to said longitudinal axis of said tank.

6. The improved hot water tank of claim 3 wherein said outlet means withdraws water from said tank through a plurality of openings positioned in a common plane perpendicular to said longitudinal axis of said tank.

7. A hot water storage tank for receiving unheated water from a water supply source and for providing heated water to a hot water user, comprising:
(a) an elongated tank having a longitudinal axis;
(b) means defining an inlet in said tank for receiving water from said unheated water supply source;
(c) means defining an outlet for delivering heated water from said tank to a user; and
(d) a first stratifier tube connected to said inlet, extending into said tank and having a plurality of openings therein, each of said openings having an axis in a plane perpendicular to said longitudinal axis, said plurality of openings being formed of a first and a second group of openings, said first group of openings being on one side of said longitudinal axis pointing in one direction and said second group of openings being on an opposite side of said longitudinal axis pointing in an opposite direction to induce a circular flow path to water flowing from said first stratifier tube.

8. A hot water storage tank as recited in claim 7 further including a second stratifier tube connected to said outlet, extending into said tank and having a plurality of openings therein, each of said openings having an axis in a plane perpendicular to said longitudinal axis, said plurality of openings being formed of a first and a second group of openings, said first group of openings being on one side of said longitudinal axis pointing in one direction and said second group of openings being on an opposite side of said longitudinal axis pointing in an opposite direction to induce a circular flow path to water withdrawn by said second stratifier tube.

* * * * *